Patented Oct. 24, 1944

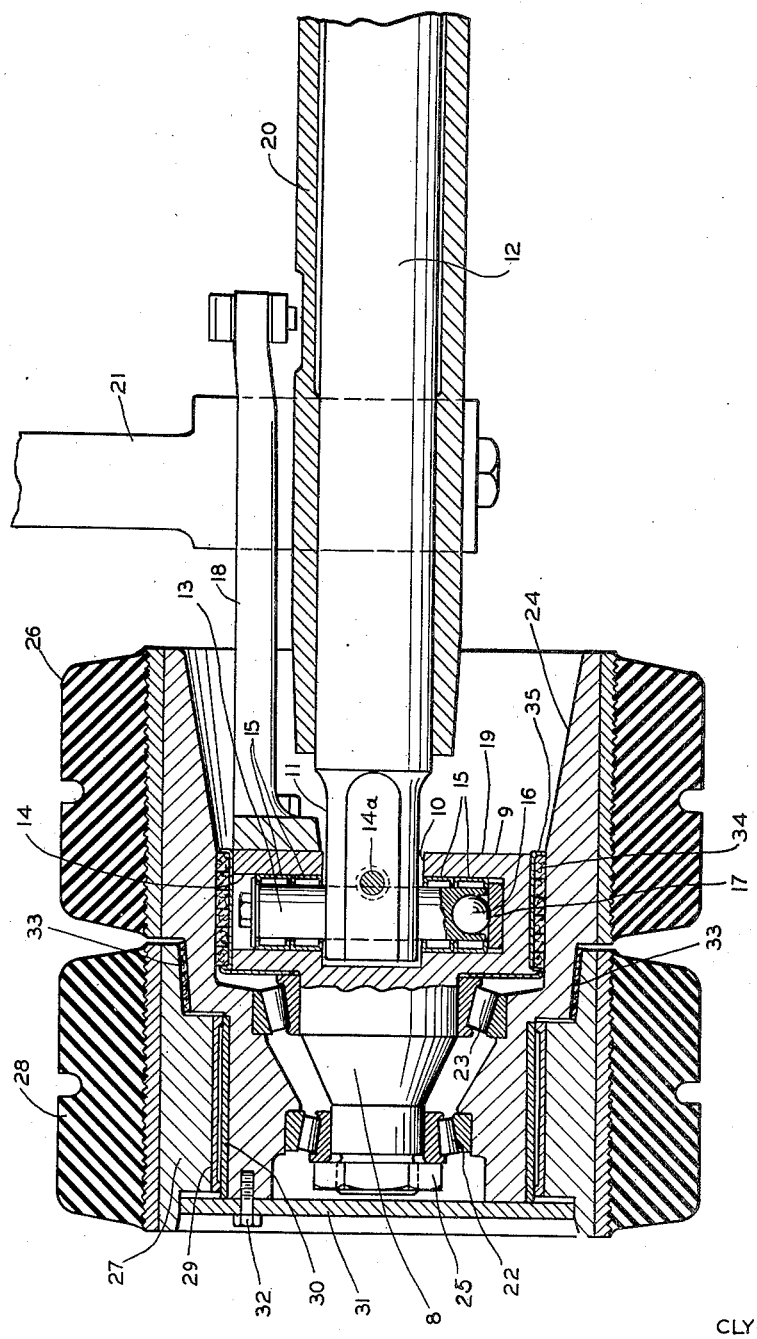

2,361,268

UNITED STATES PATENT OFFICE 2,361,268

INDUSTRIAL TRUCK

Clyde E. Cochran, Cleveland, Ohio, assignor to The Elwell-Parker Electric Company Application February 6, 1942, Serial No. 429,761

1 Claim. (Cl. 280—96.1)

This invention relates, as indicated, to industrial trucks, but has reference more particularly to a novel construction of the trail wheels of such trucks.

In industrial trucks designed to carry heavy loads, i. e., 50,000 to 60,000 lbs., and in which the trail wheels are required to be steered to facilitate movement of the truck in circles and around corners, it has heretofore been difficult to steer the truck, due to the fact that a satisfactory differential movement between the tires of the trail wheels was not provided. Moreover, the lack of a satisfactory differential movement between the tires has resulted in shortening of the life of the tires, due to scrubbing and overloading.

It is a primary object of the present invention to provide an industrial truck of the character described having novel tire mountings for the trail wheels, which will greatly facilitate steering of the truck, and will reduce to a minimum, wear and fatigue of the tires as a result of scrubbing and overloading.

To the accomplishment of the foregoing and related ends, said invention, then, consists of the means hereinafter fully described and particularly pointed out in the claim; the annexed drawing and the following description setting forth in detail certain structure embodying the invention, such disclosed structure constituting, however, but one of various structural forms in which the principle of the invention may be used.

In said annexed drawing:

Fig. 1 is an enlarged fragmentary cross-sectional view of a wheel having the invention embodied therein.

Referring more particularly to the drawing, it will be seen that each of the trailer wheels of the truck consists of a spindle 8 having an enlarged annular portion 9, provided with an axial recess 10 into which the reduced end 11 of the axle 12 extends. The spindle 8 is adapted to be rotated in a horizontal plane with respect to the axle 12, and for this purpose, a pin 13 is stationarily mounted in a diametrical recess 14 of the portion 9 of the spindle and passes through the end 11 of the axle 12 at right angles to the latter. A key 14a passes through the end 11 of the axle and through a semi-circular notch on the pin 13 so as to prevent axial movement of the pin relatively to the axle.

Bushings 15 are interposed between the pin 13 and the wall of the recess 14 so as to permit the spindle to rotate relatively to the pin, such rotation being further facilitated by the interposition of a ball 16 between the lower end of the pin and a thrust bearing element 17 at the bottom of the recess 14.

Pivotal movement of the aforesaid spindle in the manner described is effected by means of steering mechanism, of which only a steering arm 18 is shown, such arm being suitably attached to the inner face 19 of the spindle. It may be noted at this point that the axle 12 is mounted within a housing 20 which is supported by depending portions 21 of the truck trailer.

The spindle 8 has revolubly mounted thereon, as by means of tapered roller bearings 22 and 23, a wheel 24, which is restrained against axial movement relatively to the spindle 8 by means of a nut 25, which is secured to the outer end of the spindle and bears against the inner face of the bearing 22.

The wheel 24 has press fitted thereon a tire 26, which will hereinafter be referred to as the "inboard" tire. The wheel has a reduced outer or hub portion on which is revolubly mounted a wheel 27 having a tire 28 press-fitted thereon, the tire 28 being hereinafter referred to as the "outboard" tire. To facilitate rotation of the wheel 27, relatively to the wheel 24, the wheel 27 has mounted therein a bronze sleeve 29 which bears against a hardened steel sleeve 30 on the hub portion of the wheel 24.

In order to seal the bearings 22 as well as the sleeves 29 and 30 against entrance of dirt, a cap or cover plate 31 is removably secured to the wheel 24, as by means of screws 32. The sleeves 29 and 30 are further sealed against the entrance of dirt by means of felt washers 33 which are interposed between the wheels 24 and 27. In order to seal the bearings 23 against entrance of dirt, felt washers 34 are interposed between the enlarged portion 9 of the spindle and the wheel 24, these washers being retained in position by means of an annular shield 35, mounted on the portion 9 of the spindle, and which serves, incidently, to prevent access of dirt into the recess 14.

It will be apparent from the foregoing description, that, since the tire 28 is free to rotate relatively to the tire 26, a differential action is provided between the tires, thereby preventing scrubbing of the tires when turning in a circle. This differential action also enables the truck to be steered with less effort.

Having thus described my invention, I claim:

In an industrial truck, the combination of an axle, a pin carried by the axle and disposed at right angles thereto, a spindle rotatable about said pin, said spindle including an enlarged annular portion housing the pin and being provided with bearing portions rotatably engaging the pin, a dual-wheel hub member mounted on the spindle and completely enclosing the spindle and the annular pin receiving portion thereof, bearing means interposed between the spindle and hub, said hub member having wheel mounting portions lying inboard and outboard with respect to the axis of the pin, said inboard wheel mounting portion of the hub having an inner annular portion surrounding and opposed to the enlarged annular portion of the spindle, sealing means interposed between the annular portions of the spindle and hub for preventing ingress of dirt to the hub and spindle bearing, a wheel member mounted on the inboard wheel receiving portion of the hub member, a wheel member mounted on the outboard wheel receiving portion of the hub member and means providing for differential action between the wheel members and said hub member.

CLYDE E. COCHRAN.